United States Patent
Suzuki

(10) Patent No.: US 12,223,376 B2
(45) Date of Patent: Feb. 11, 2025

(54) INFORMATION PROCESSING APPARATUS THAT DETERMINES WHETHER TO SET A COLOR MODE BASED ON PROCESSING CORRESPONDING TO A MONOCHROME MODE, METHOD, STORAGE MEDIUM STORING PROGRAM, AND SYSTEM

(71) Applicant: CANON KABUSHIKI KAISHA, Tokyo (JP)

(72) Inventor: Tomohiro Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/475,165

(22) Filed: Sep. 26, 2023

(65) Prior Publication Data
US 2024/0028854 A1    Jan. 25, 2024

Related U.S. Application Data

(63) Continuation of application No. 17/745,745, filed on May 16, 2022, now Pat. No. 11,809,928.

(30) Foreign Application Priority Data

Jun. 10, 2021 (JP) .................................. 2021-097465

(51) Int. Cl.
G06K 15/02    (2006.01)
(52) U.S. Cl.
CPC ..... G06K 15/1889 (2013.01); G06K 15/1805 (2013.01); G06K 15/1852 (2013.01); G06K 15/188 (2013.01); G06K 15/1885 (2013.01)

(58) Field of Classification Search
None
See application file for complete search history.

(56) References Cited

U.S. PATENT DOCUMENTS

| 2002/0181025 | A1* | 12/2002 | Yamaguchi ........... G06T 1/0021 382/100 |
| 2003/0059085 | A1 | 3/2003 | Miyake et al. ............... 382/100 |
| 2005/0135856 | A1* | 6/2005 | Uchida .............. H04N 1/00883 399/411 |
| 2019/0005601 | A1* | 1/2019 | Ishida ...................... H04N 1/54 |
| 2021/0174468 | A1* | 6/2021 | Ogawa .................. G06T 1/0021 |

FOREIGN PATENT DOCUMENTS

JP    2003-174556    6/2003

* cited by examiner

Primary Examiner — Miya J Cato
(74) Attorney, Agent, or Firm — Venable LLP

(57) ABSTRACT

An information processing apparatus sets a color mode in place of a monochrome mode on condition that the monochrome mode and multiplexing of additional information on a print target image are set as print settings based on an input image data; generates, based on the input image data, color image data corresponding to printing in a color mode which represents a color of the monochromated print target image by a value of a color signal; performs, for the color image data generated by the generation unit, processing for multiplexing the additional information on the print target image; and causes a printing apparatus to print, in the color mode, a multiplexed image on which the additional information is multiplexed.

11 Claims, 18 Drawing Sheets

FIG. 4A

| 10 | 10 | 0 | 0 | -10 | -10 | 0 | 0 |
|---|---|---|---|---|---|---|---|
| 0 | 10 | 10 | 0 | 0 | -10 | -10 | 0 |
| 0 | 0 | 10 | 10 | 0 | 0 | -10 | -10 |
| -10 | 0 | 0 | 10 | 10 | 0 | 0 | -10 |
| -10 | -10 | 0 | 0 | 10 | 10 | 0 | 0 |
| 0 | -10 | -10 | 0 | 0 | 10 | 10 | 0 |
| 0 | 0 | -10 | -10 | 0 | 0 | 10 | 10 |
| 10 | 0 | 0 | -10 | -10 | 0 | 0 | 10 |

FIG. 4B

| 10 | 0 | 0 | -10 | -10 | 0 | 0 | 10 |
|---|---|---|---|---|---|---|---|
| 0 | 0 | -10 | -10 | 0 | 0 | 10 | 10 |
| 0 | -10 | -10 | 0 | 0 | 10 | 10 | 0 |
| -10 | -10 | 0 | 0 | 10 | 10 | 0 | 0 |
| -10 | 0 | 0 | 10 | 10 | 0 | 0 | -10 |
| 0 | 0 | 10 | 10 | 0 | 0 | -10 | -10 |
| 0 | 10 | 10 | 0 | 0 | -10 | -10 | 0 |
| 10 | 10 | 0 | 0 | -10 | -10 | 0 | 0 |

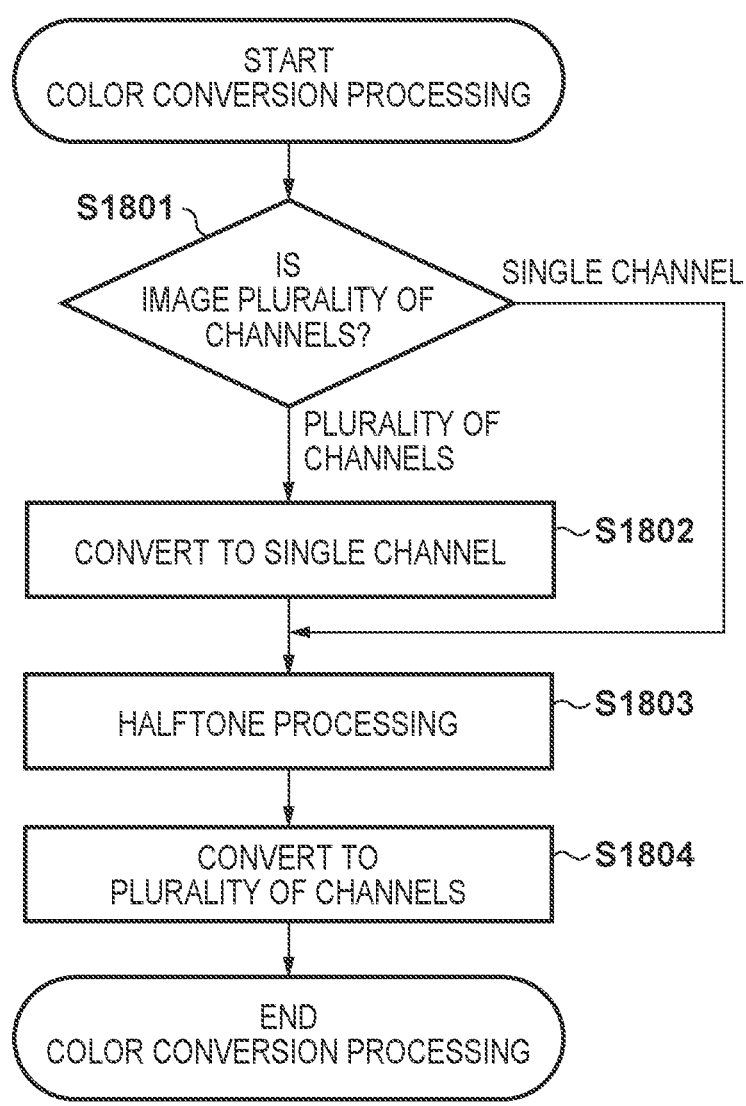

INFORMATION PROCESSING APPARATUS THAT DETERMINES WHETHER TO SET A COLOR MODE BASED ON PROCESSING CORRESPONDING TO A MONOCHROME MODE, METHOD, STORAGE MEDIUM STORING PROGRAM, AND SYSTEM

This application is a continuation of application Ser. No. 17/745,745 filed May 16, 2022, currently pending; and claims priority under 35 U.S.C. § 119 to Japan Application JP 2021-097465 filed in Japan on Jun. 10, 2021; and the contents of all of which are incorporated herein by reference as if set forth in full.

BACKGROUND OF THE INVENTION

Field of the Invention

The present invention relates to an information processing apparatus for multiplexing additional information on image data, a method, a storage medium storing a program, and a system.

Description of the Related Art

There is conventionally known a technique called an electronic watermark technique of multiplexing additional information on a print product in such a way that it is difficult to visually discriminate (Japanese Patent Laid-Open No. 2003-174556). Superimposing data of another meaning on data, like steganography or watermark, or a technical field thereof will generally be referred to as "multiplexing". Multiplexing includes multiplexing of identification information to prevent unauthorized forgery of a banknote, a stamp, a security, or the like and multiplexing of audio information on a photo. When multiplexed information is read by, for example, a smartphone, it is possible to provide various added value to a user.

SUMMARY OF THE INVENTION

The present invention provides an information processing apparatus for preventing missing of multiplexed additional information due to print processing, a method, a storage medium storing a program, and a system.

The present invention in one aspect provides an information processing apparatus comprising: an acquisition unit configured to acquire input image data representing a print target image; a setting unit configured to set a color mode in place of a monochrome mode on condition that the monochrome mode and multiplexing of additional information on the print target image are set as print settings based on the input image data; a generation unit configured to generate, based on the input image data, color image data corresponding to printing in the color mode which represents a color of the monochromated print target image by a value of a color signal; a multiplexing unit configured to perform, for the color image data generated by the generation unit, processing for multiplexing the additional information on the print target image; and a control unit configured to cause a printing apparatus to print a multiplexed image on which the additional information is multiplexed based on the color image data processed by the multiplexing unit in the color mode set by the setting unit.

According to the present invention, it is possible to prevent missing of multiplexed additional information due to print processing.

Further features of the present invention will become apparent from the following description of exemplary embodiments with reference to the attached drawings.

BRIEF DESCRIPTION OF THE DRAWINGS

FIGS. 4A and 4B are views showing masks;

FIG. 18 is a flowchart showing color conversion processing.

DESCRIPTION OF THE EMBODIMENTS

Figure 1:
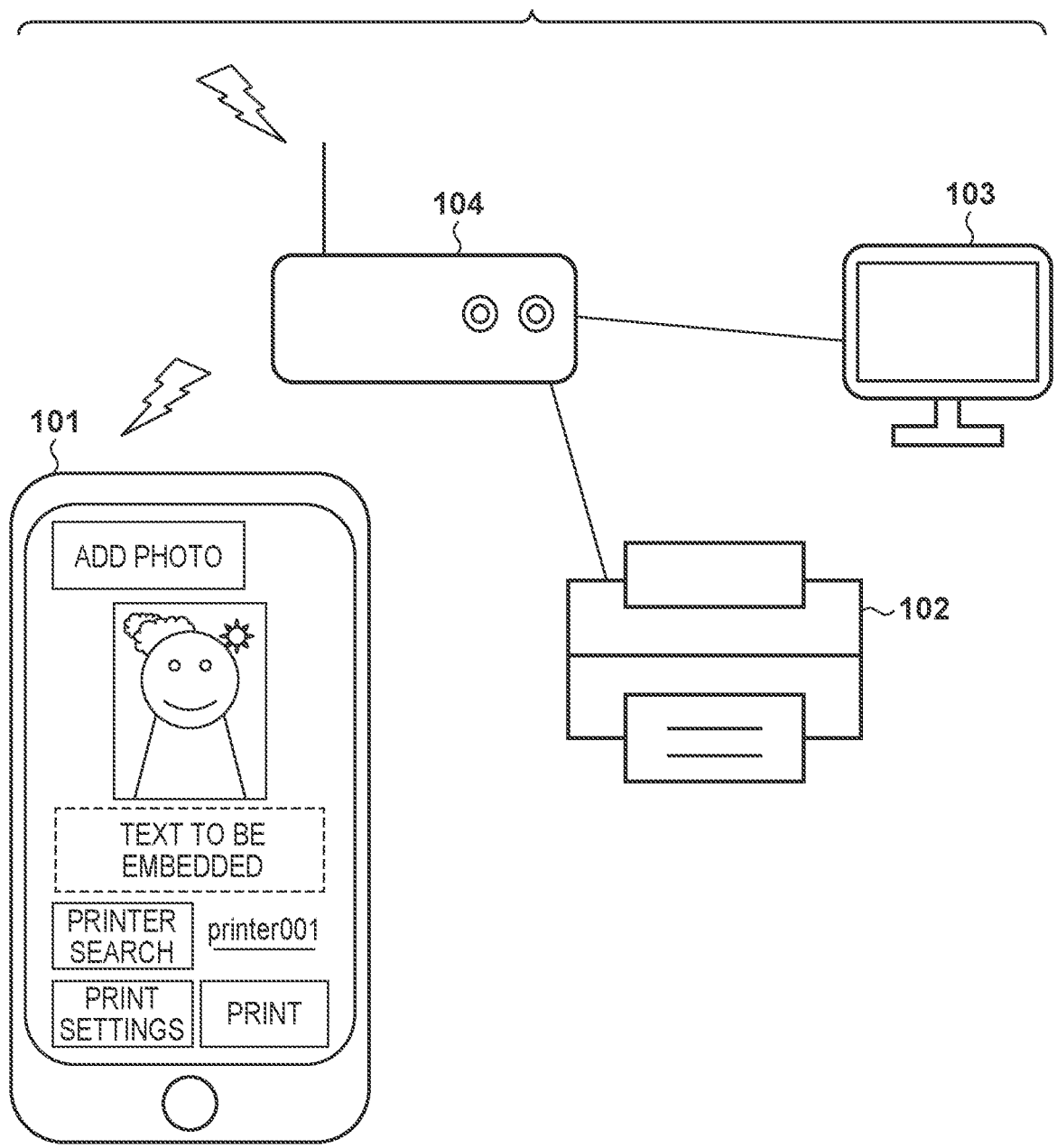
FIG. 1 is a view showing a system configuration including information processing apparatuses.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

If print settings are done to perform monochrome printing of image data on which additional information is multiplexed by changing color components, the additional information is missing due to the processing of monochrome printing by a printer.

According to the present invention, it is possible to prevent missing of multiplexed additional information due to print processing.

FIG. 1 is a view showing an example of a system configuration including information processing apparatuses 101 and 103 according to this embodiment. The information processing apparatuses 101 and 103 are portable terminals such as a smartphone and a PC, and a description will be made assuming that the information processing apparatuses 101 and 103 have a common configuration. However, the configurations of the information processing apparatuses 101 and 103 may be different.

In the system, a user can store image data captured by an image capturing device inside. In the system, a router 104 and an image processing apparatus 102, and the router 104 and the information processing apparatus 103 are connected to be communicable with each other by wired communication via a LAN cable or the like. Also, the information processing apparatus 101 and the router 104 are connected to be communicable with each other by wireless communication such as Wifi. Note that the router 104 and the image processing apparatus 102 or the information processing apparatus 103 may be connected by wireless communication. The wireless communication may be Bluetooth, NFC, or the like in addition to Wifi.

In this embodiment, in the system as shown in FIG. 1, the user can select print target image data by an application on the information processing apparatus 101 and multiplex arbitrary additional information such as a watermark on the image data. That is, the information processing apparatus 101 can operate as an additional information multiplexing apparatus that multiplexes additional information on image data. In addition, the user can print, using the image processing apparatus 102, the image data with the multiplexed additional information. In this embodiment, text information will be described as an example of additional information. However, additional information may be information of another type, for example, audio information. When another user captures the print product using the information processing apparatus 101, the multiplexed additional information is extracted. That is, the information processing apparatus 101 can operate as an additional information extraction apparatus. For example, an operation of reproducing an audio by capturing a print product is implemented.

Figure 2:
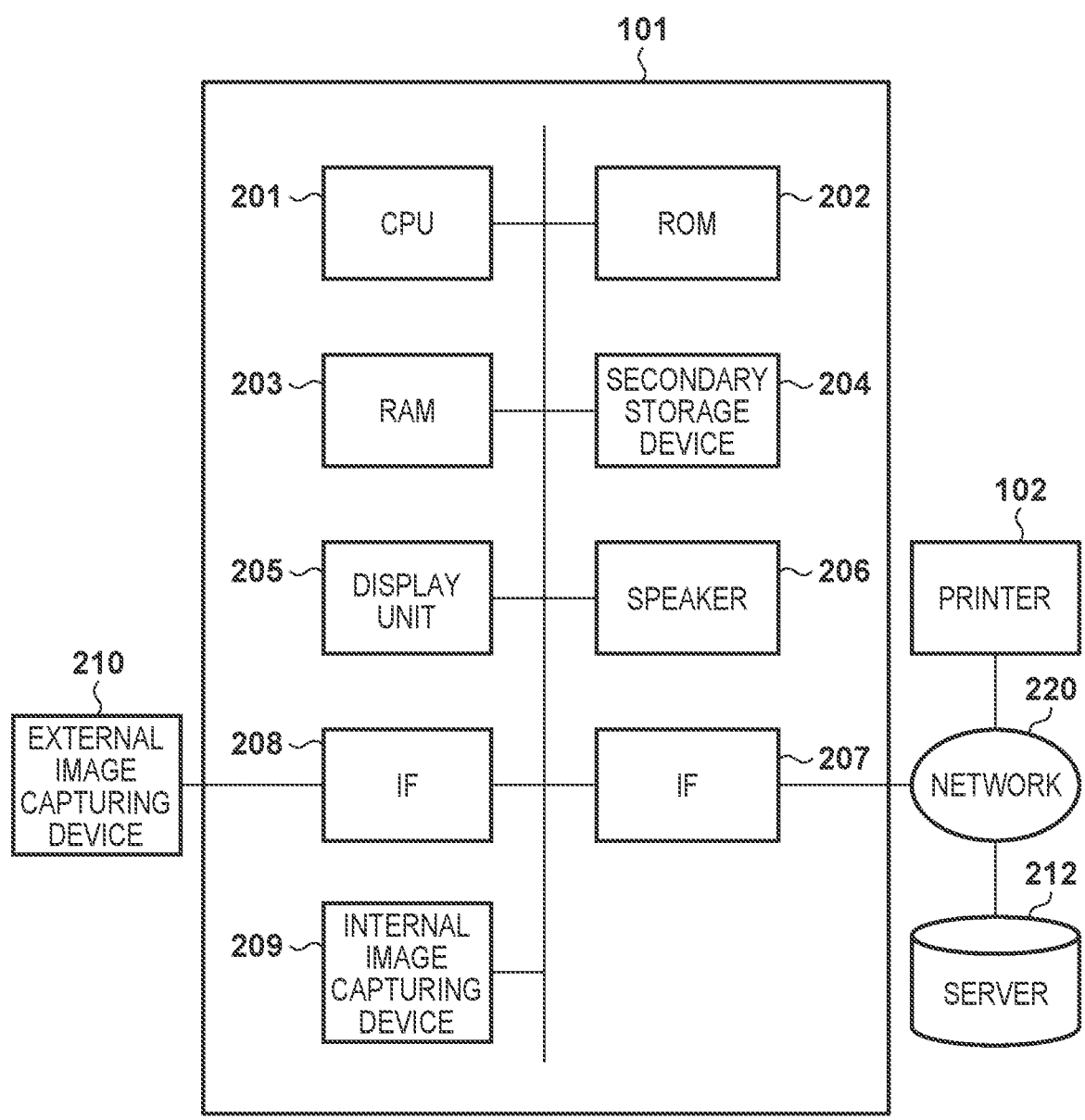
FIG. 2 is a block diagram showing the hardware configuration of an information processing apparatus.

FIG. 2 is a block diagram showing an example of the hardware configuration of the information processing apparatus 101. A CPU 201 is a central processing unit, and executes, for example, processing of multiplexing additional information in accordance with a program. A ROM 202 stores programs to be executed by the CPU 201. A RAM 203 provides a memory used to temporarily store various kinds of information at the time of program execution by the CPU 201. A secondary storage device 204 is a storage medium configured to store an image file or additional information to be multiplexed. A display unit 205 displays a user interface screen or processing contents. The display unit 205 may have a touch panel function, and accepts an instruction of processing, a setting, character input, or the like in accordance with a user operation on the touch panel. A speaker 206 outputs an audio. For example, if decoded and extracted additional information is audio data, the speaker 206 outputs an audio.

A network interface (IF) 207 is connected to a network 220 such as a LAN (Local Area Network). The network 220 may include the Internet. For example, the CPU 201 accesses, via the network interface 207, a site provided by a server 212 connected to the Internet and causes the display unit 205 to display the screen of the site. An internal image capturing device 209 is a device having an image capturing function, and is, for example, an internal camera. An external image capturing device 210 is an external device having an image capturing function and connected to the information processing apparatus 101 via a device interface (IF) 208, and is, for example, a digital camera or a video camera.

In this embodiment, the information processing apparatus 101 serving as an additional information multiplexing apparatus will be described. However, the information processing apparatus 101 may operate as an additional information multiplexing apparatus.

Figure 3:
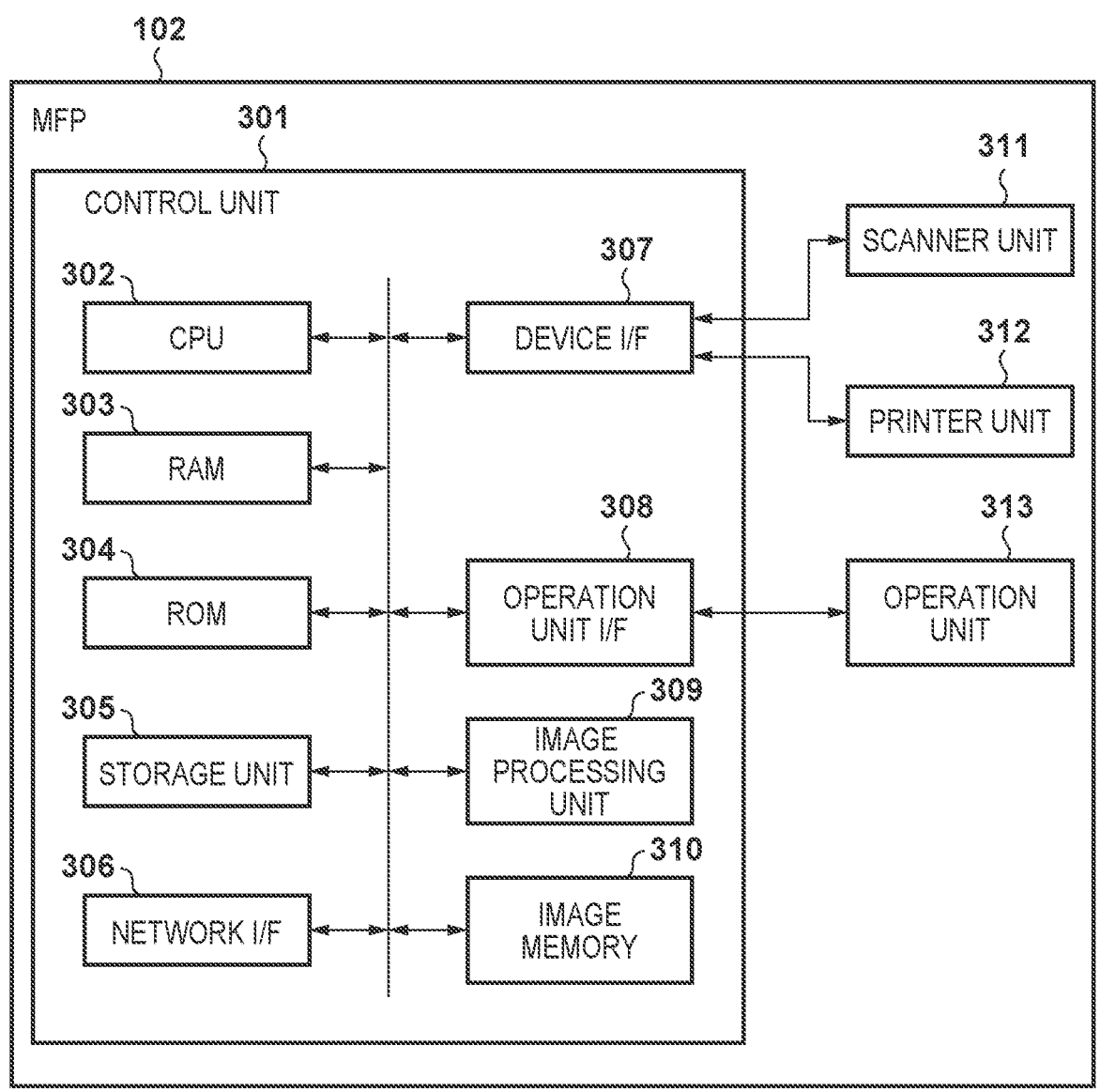
FIG. 3 is a block diagram showing an example of the hardware configuration of an image processing apparatus.

FIG. 3 is a block diagram showing an example of the hardware configuration of the image processing apparatus 102. In this embodiment, the image processing apparatus 102 will be described as an MFP (Multi Functional Peripheral). However, the image processing apparatus 102 needs only to be a printing apparatus (printer) having a print function and need not always have the configuration of an MFP. A control unit 301 is connected to a scanner unit 311 that is an image input device and a printer unit 312 that is an image output device, and controls input/output of image information to/from each device. In addition, the control unit 301 can communicate with the information processing apparatus 101, the router 104, and the information processing apparatus 103 via a network I/F 306. For example, the control unit 301 can receive a print job or image data from the information processing apparatus 101 or the information processing apparatus 103.

A CPU 302 generally controls the operation of the image processing apparatus 102, and operates based on, for example, a program stored in a RAM 303. A ROM 304 is, for example, a boot ROM, and stores the boot program of the system. A storage unit 305 stores system software, image data, a program configured to control the operation of the image processing apparatus 102, and the like. The CPU 302 loads the program stored in the storage unit 305 to the RAM 303 and controls the units of the image processing apparatus 102 based on the program.

The network I/F 306 connects the control unit 301 to the network 220, communicates with a device on the network 220, and inputs/outputs various kinds of information. A device I/F 307 connects the scanner unit 311 and the printer unit 312, which are image input/output devices, to the control unit 301, and performs conversion of the synchronous system/asynchronous system of image data. An operation unit I/F 308 is an interface that connects an operation unit 313 and the control unit 301, and outputs, to the operation unit 313, data to be displayed on the operation unit 313. The operation unit 313 includes a panel and hardware keys and can accept an instruction or a setting operation from the user. Also, the operation unit I/F 308 transmits, to the CPU 302, information that the user inputs from the operation unit 313.

An image processing unit 309 performs, for example, image processing such as correction, interpolation, and conversion according to a setting or the characteristic of an input/output device for print target image data received via the network. Also, the image processing unit 309 performs image processing for image data to be input to the device I/F 307 or output from the device I/F 307. An image memory 310 is a memory configured to temporarily expand image data to be processed by the image processing unit 309.

Multiplexing embedding processing (multiplexing encoding processing) to be performed by the information processing apparatus 101 will be described below. Here, a method of multiplexing information "hello" on an input image will be described as an example.

Handling information by an information processing apparatus such as a PC means handling binary data. Binary data is information "0" or "1". Pieces of information "0" and "1" are continuously connected, thereby obtaining a specific meaning. For each character, corresponding binary data is determined. Which character corresponds to which binary data is defined by information called "character code". For example, in "shift JIS" that is one of character codes, "h" corresponds to binary data "01101000". Similarly, "e" corresponds to binary data "01100101", "l" corresponds to binary data "01101100", and "o" corresponds to binary data "01101111".

That is, characters "hello" can be expressed by binary data "0110100001100101011011000110110001101111".

Reversely, if binary data "0110100001100101011011000110110001101111" can be acquired, characters "hello" can be acquired. That is, multiplexing can be implemented by embedding data such that "0" or "1" can be determined. In multiplexing, "hello" is input. However, actually embedded data is "0110100001100101011011000110110001101111". In this embodiment, to discriminate the two data, "hello" is called additional information (multiplexed information), and "0110100001100101011011000110110001101111" converted for embedding is called embedded data.

A method of multiplexing pieces of information "0" and "1" on an image will be described next. In this embodiment, embedding of data representing "0" and "1" will be explained. However, the multiplexing method is not limited to embedding of "0" and "1". The multiplexing method is not limited to embedding of "0" and "1" if it is possible to uniquely associate data on the encoding side with data on the decoding side.

A description will be made assuming that the size of an image to be multiplexed is 640 pixels (px) (height)×480 pixels (px) (width). Here, two masks shown in FIGS. 4A and 4B are prepared to generate "0" and "1".

Figure 5B:
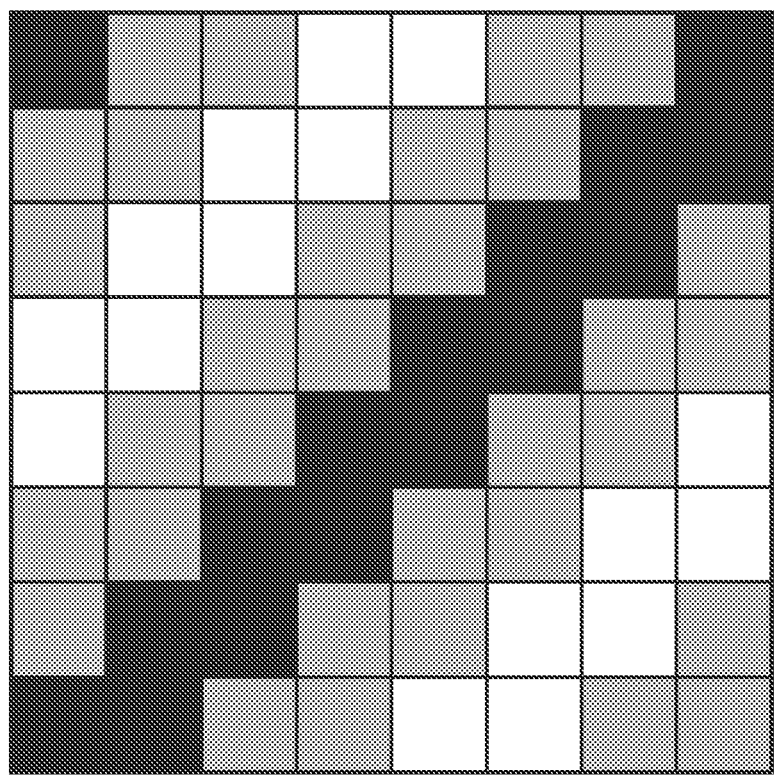
FIGS. 5A and 5B are views visually showing patterns given to an image by the masks.
Figure 5A:
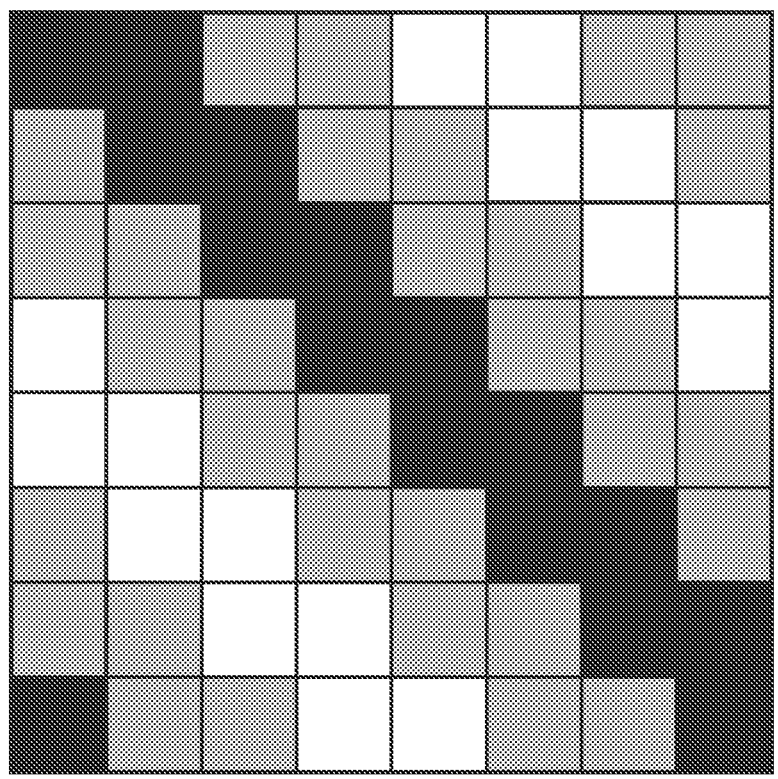

FIGS. 4A and 4B show masks each formed in a size of 8 px×8 px. When values in a mask are added to an image, a pattern having periodicity can be given to an 8 px×8 px region in the image. FIGS. 5A and 5B visually show what kinds of patters are given to an image by the masks. In FIGS. 5A and 5B, a position of "10" in the masks shown in FIGS. 4A and 4B is expressed by black, a position of "0" is expressed by gray, and a position of "−10" is expressed by white. Oblique lines as shown in FIGS. 5A and 5B appear in the image.

A pseudo code for alternately adapting the masks shown in FIGS. 4A and 4B to an entire image is shown below.

```
01:     int i, j, k, l;
02:     int width = 640, height=480;
03:     unsigned char *data = image data;
04:     int **maskA = mask data;
05:     bool isMaskA = true;
06:       for(j = 0; j < height; j+=8){
07:         for(i = 0; i < width; i+=8){
08:           for(k = 0; k < 8; k++){
09:             for(l = 0; l < 8; l++){
10:               if(isMaskA == true){
11:                 data[(i+k)+(j+l)*width] += maskA[k][l];
12:         }
13:         }
14:         }
15:         }
16:         }
```

Figure 6:
FIG. 6 is a view showing a grayscale image.
Figure 7:
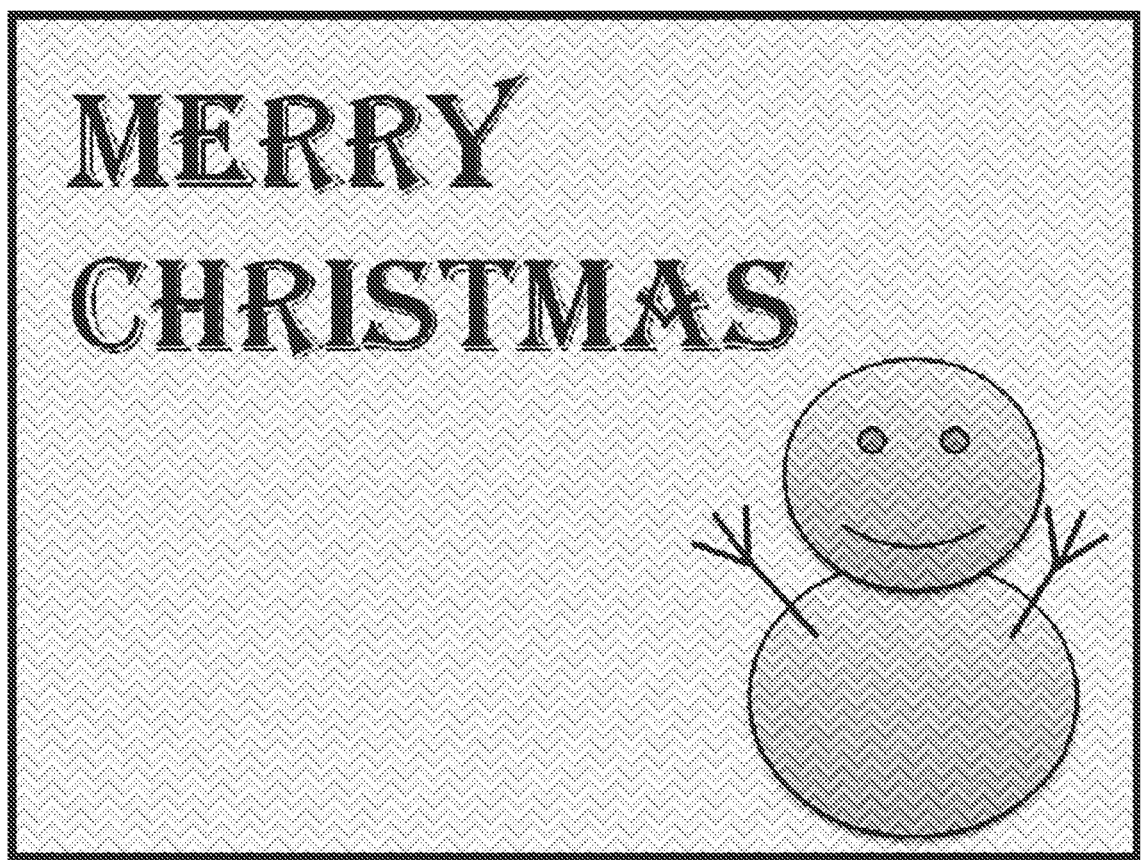
FIG. 7 is a view showing a result of executing multiplexing.

Image data in the third row assumes a grayscale image. Here, a grayscale image as shown in FIG. 6 is assumed. FIG. 7 shows an example in which multiplexing using the 8 px×8 px masks shown in FIGS. 4A and 4B is executed for the grayscale image shown in FIG. 6. As shown in FIG. 7, oblique lines (corresponding to "0" and "1") are alternately formed on the image.

Figure 8:
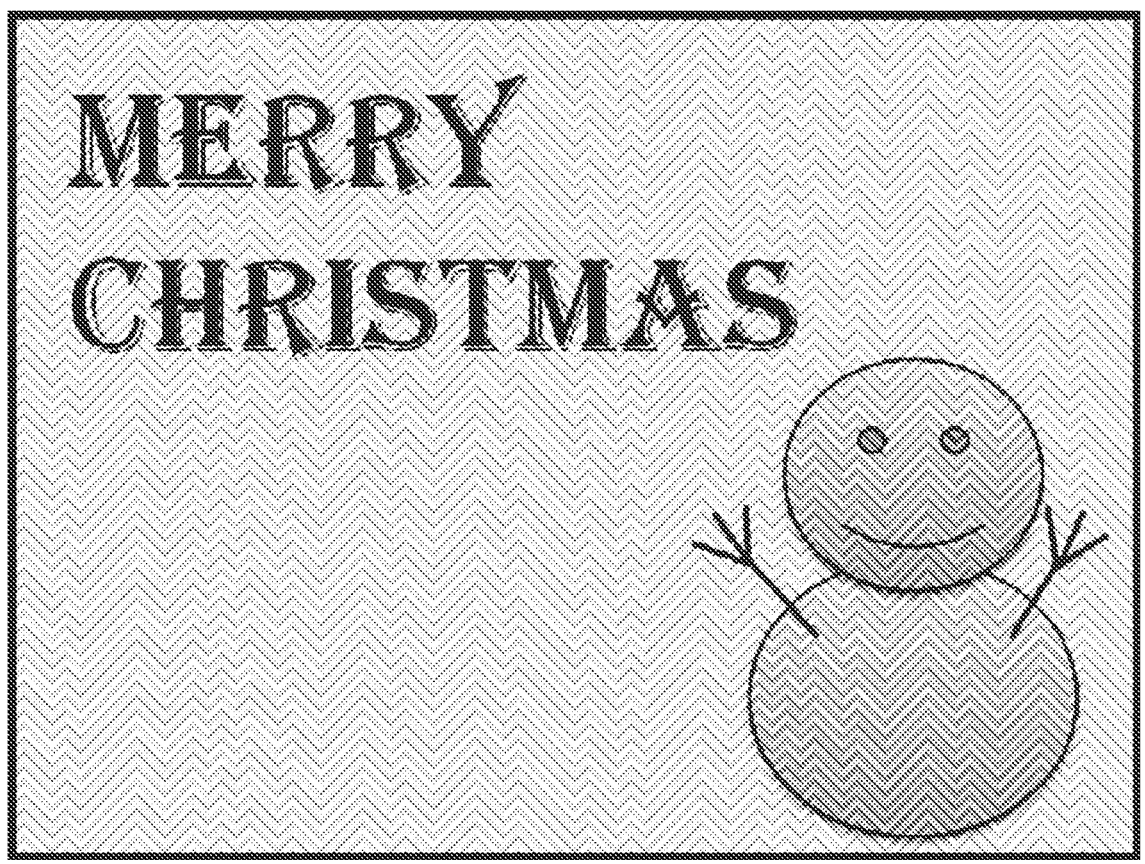
FIG. 8 is a view showing a result of executing multiplexing.

FIG. 8 shows an example in which "0110100001100101011011000110110001101111" that is data of "hello" is adapted, instead of simply repeating "0" and "1". For "hello" itself, since 40 8 px×8 px blocks suffice, and a region having a size of 320 px×8 px suffices. In FIG. 8, "hello" is repetitively multiplexed. When the same data is repetitively multiplexed in this way, resistance to pattern disappearance caused by a flaw or dirt of a photo can be increased. In addition, if a plurality of identical data exist, search is easy in decoding.

In this example, since the image size is 640 px×480 px, the total number of pixels is 307,200. Also, the number of pixels necessary for multiplexing "hello" is 320 px×8 px=2, 560, as described above. That is, "hello" is repeated 307, 200÷2560=120 times.

When multiplexing additional information, data embedding is performed, as described above. In general, additional information is multiplexed in a region to which a human eye is difficult to react. For example, a and b components after an image is decomposed into Lab components, U and V components after an image is decomposed into YUV components, or Cb and Cr components of YCbCr are varied, thereby multiplexing additional information. Also, for example, in the YUV components, a single U component may be varied, or both U and V components may be varied.

When varying a single component, the algorithm is simpler than in a case in which a plurality of components are varied. As a result, the program size become small. For this reason, an application can be downloaded at a high speed, or reduction of the manufacturing cost can be implemented because the circuit area becomes small.

When a plurality of components are varied, it is possible to reduce influence that occurs due to the fact that data cannot be embedded. For example, if a digital image is expressed by 8 bits per color, one of values 0 to 255 is assigned. Values outside the range cannot be used as image data. For this reason, if the calculation result of a pixel value is smaller than 0 or equal to or larger than 256, 0 or 255 is generally assigned to make the value fall within the effective range. The masks shown in FIGS. 4A and 4B give a change of ±10 to each pixel value. However, for example, if all U components of YUV components in a mask region have a value of 255, the values in the region fall within the range of not 245 to 265 but 245 to 255. In this case, only a variation smaller than predetermined is given as a result, and multiplexing weak to noise and difficult to decode is performed. However, if the U components of YUV components have a value of 255, and V components have a value of 128, that is, if the pixel values can fall within the effective range when changed by ±10, noise resistance can be maintained by using the V components. As described above, when both the U and V components are used, the robustness of multiplexing (the fastness of decoding) can be increased. When converting an image into the RGB format, the U and V components may be changed while confirming whether RGB components after the YUV components are converted into RGB components also fall within the range of 0 to 255.

As described above, when binary information is superimposed by giving a periodical variation, embedding of data (multiplexing encoding) is implemented.

In this embodiment, the information processing apparatus 101 may operate as an additional information extraction apparatus. Processing (decoding) of decoding embedded data in that case will be described.

Figure 9:
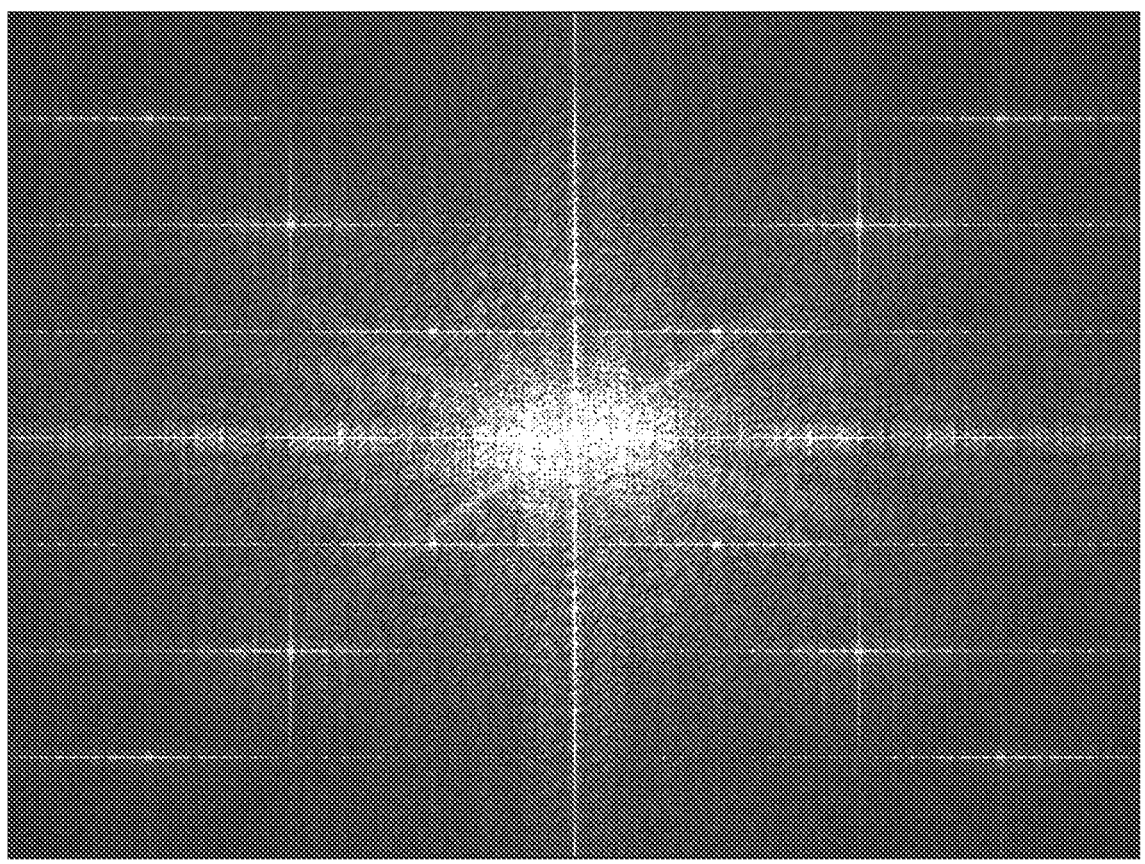
FIG. 9 is a view showing a result of adapting FFT.
Figure 10:
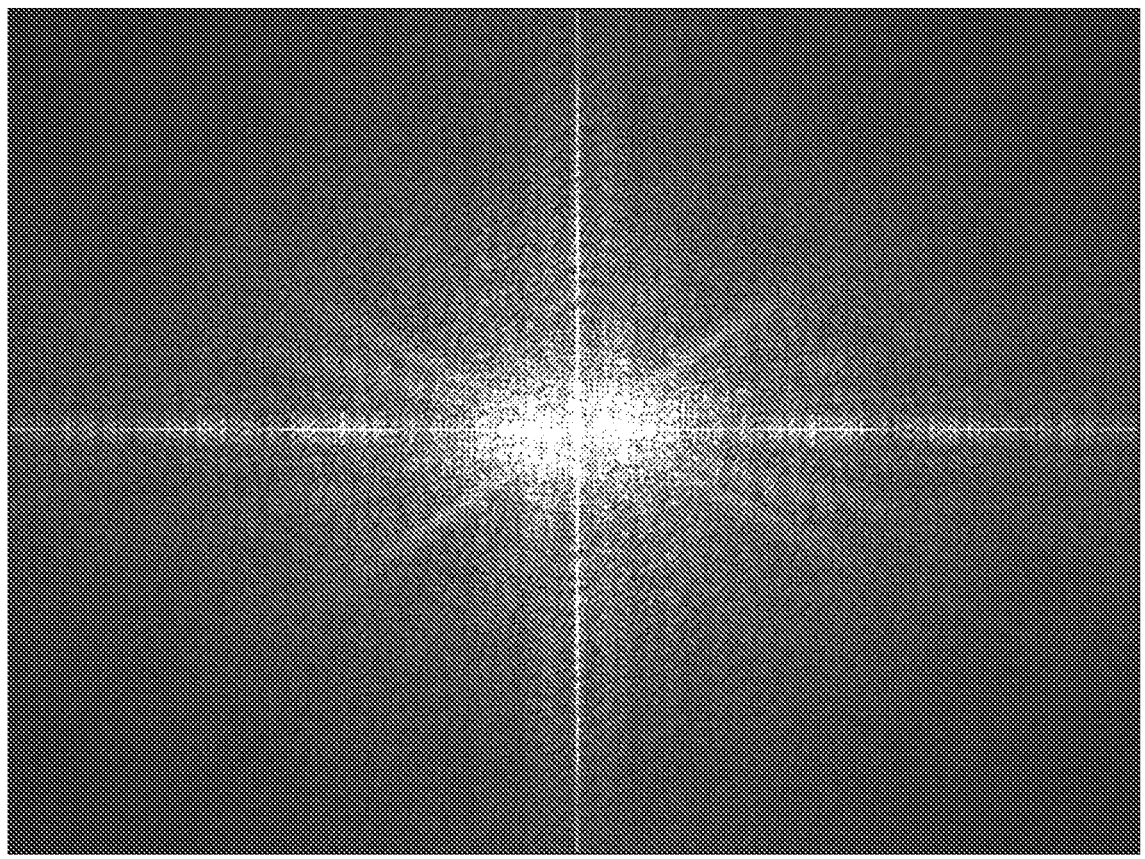
FIG. 10 is a view showing a result of adapting FFT.
Figure 11:
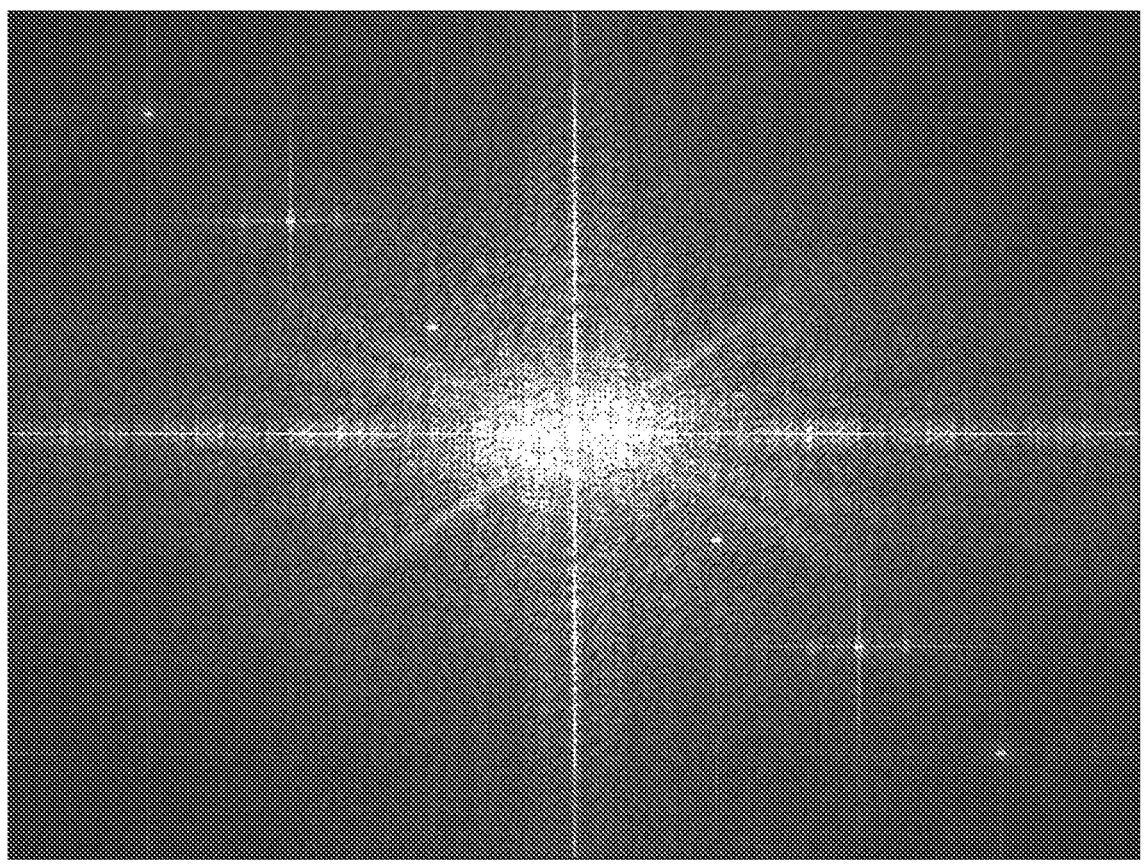
FIG. 11 is a view showing a result of adapting FFT.
Figure 12:
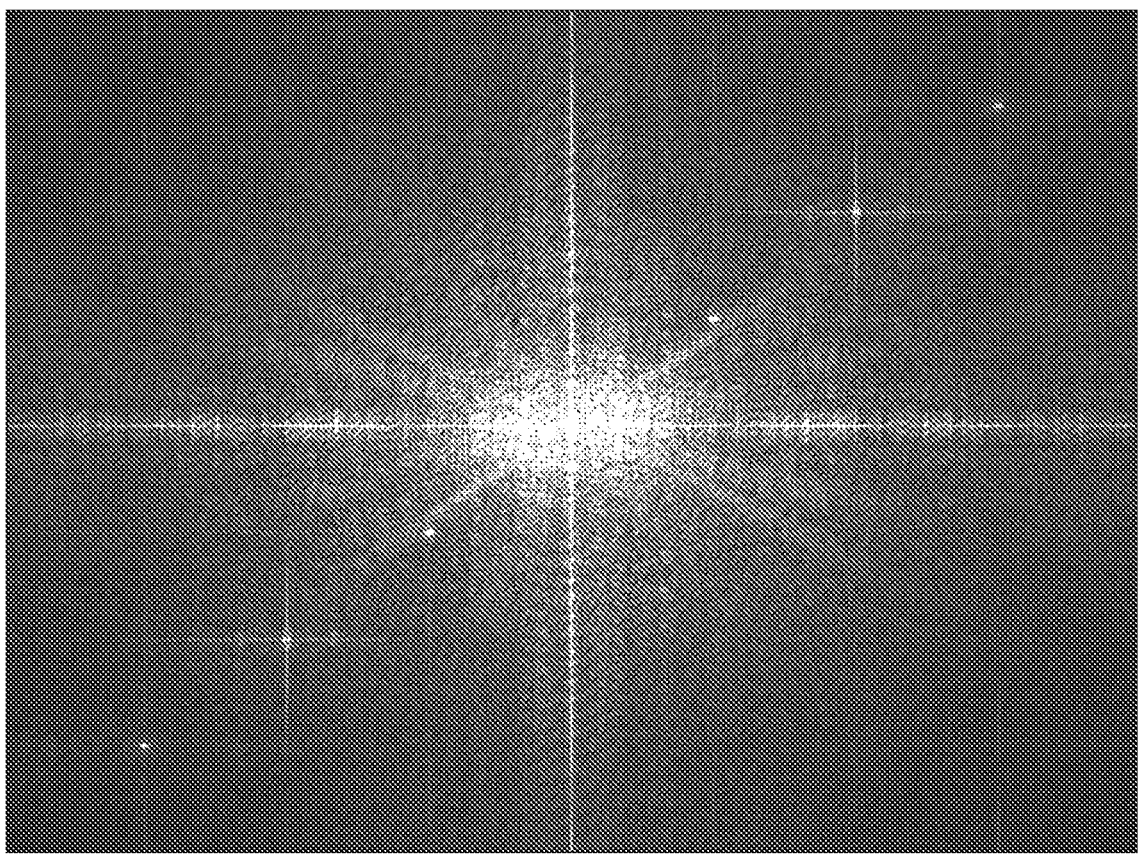
FIG. 12 is a view showing a result of adapting FFT.

The mask shown in FIG. 4A has a periodical pattern, and FFT (Fast Fourier Transform) is adapted to a grayscale image shown in FIG. 8 to extract the feature. FIG. 9 shows an example of a result of adapting FFT to an image in which data with a periodical pattern is embedded. On the other hand, FIG. 10 shows an example of a result of adapting FFT to the grayscale image shown in FIG. 6 in which data embedding is not performed. In FIG. 9, it is found that spectra (white spots) appear at specific positions, as compared to FIG. 10. FIG. 11 is a view showing an example of a result of multiplexing only "0" on the grayscale image shown in FIG. 6 and adapting FFT. FIG. 12 is a view showing an example of a result of multiplexing only "1" on the grayscale image shown in FIG. 6 and adapting FFT. FFT is a method used to analyze the frequency of an image, and a variation of the periodical pattern of the mask changes the frequency of the image. For this reason, when FFT is adapted, spectra appear at specific positions. Hence, when the state is read, embedded data can be recognized and decoded.

Even if both the characteristics of "0" and "1" are included, as shown in FIG. 9, recognition needs to be possible. Hence, to determine one of "0" and "1", FFT analysis is performed in the same size of 8 px×8 px as the multiplexing block, thereby making the size in embedding match the size in analysis. When FFT is executed only in this range, spectra appear in correspondence with only one value, and one of "0" and "1" can be determined.

Figure 13:
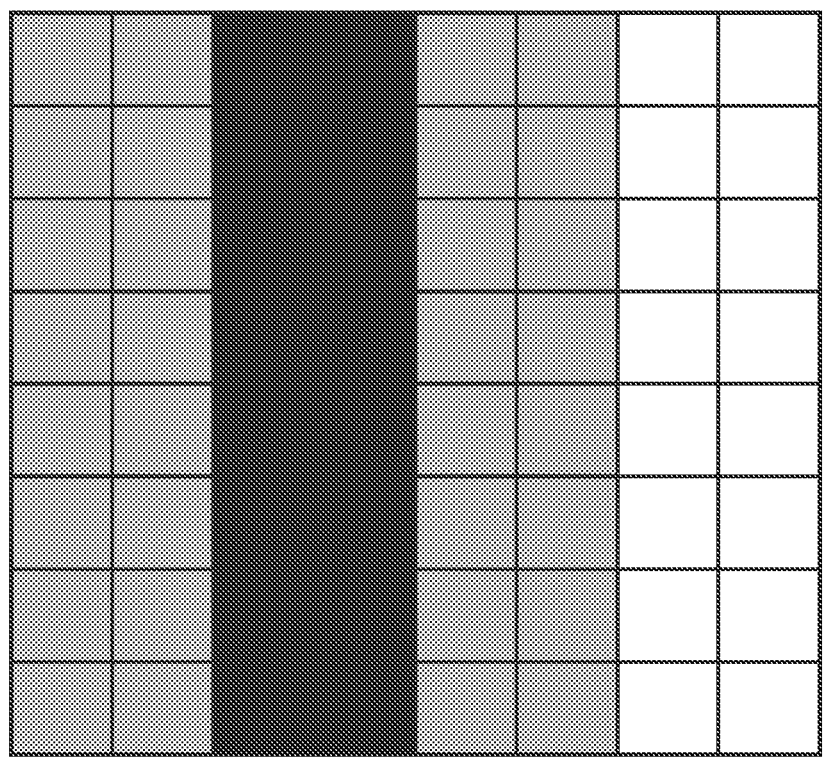
FIG. 13 is a view showing a pattern for start position determination.

On the decoding side, when decoding data, the position where the data starts may be specified. In this case, for example, a "patten for start position determination", which is different from the pattern of "0" and "1", is prepared, thereby enabling data start determination. FIG. 13 is a view showing an example of the pattern for start position determination. As shown in FIG. 13, the pattern for start position determination is a mask pattern different from FIGS. 5A and 5B. In the mask pattern shown in FIG. 13, if a y-axis is defined along the vertical direction of the image, and an x-axis is defined along the horizontal direction, the peak of spectra appears in the direction of the x-axis from the center of the image. If the pattern for start position determination is detected at two points, additional information can be extracted by decoding "0" and "1" between the points.

Also, on the decoding side, processing for enabling FFT analysis may be performed. If an image is acquired, via an image capturing sensor (for example, a camera), from a print product on which additional information is multiplexed, the image is not necessarily be obtained in a correct direction. For example, the distance between the image capturing sensor and the print product may be short or long, and data may not always be decoded even if the acquired image is FFT-analyzed for each 8 px×8 px block. In the above-described multiplexing, the image is changed such that a strong spectrum appears for a specific frequency, and where the spectrum should appear is known. Based on this, on the decoding side, image conversion may be performed before the FFT analysis such that spectra obtained from the acquired image using the image capturing sensor become close to the known spectra.

The operation of the information processing apparatus 101 according to this embodiment will be described below.

On the information processing apparatus 101, the user can do various kinds of print settings for printing in the image processing apparatus 102, and can set, for example, "monochrome printing" or "color printing".

To multiplex additional information, variations are given to the color components of an image, as described above. On the other hand, if the user sets "monochrome printing" as a print setting, processing (monochrome conversion) into two monochrome tones is performed in the image processing apparatus 102. That is, even if additional information is multiplexed, the color component on which multiplexing is performed is missing due to processing in two monochrome tones in the image processing apparatus 102. As a result, the additional information multiplexed on the multiplexed image cannot be decoded. In this embodiment, when multiplexing additional information, if the user sets "monochrome printing", and the print target image data is color image data, grayscale conversion is performed, and setting conversion from "monochrome printing" to "color printing" is performed. With this configuration, it is possible to maintain image quality close to the tint of monochrome printing desired by the user and prevent missing of the color component caused by performing processing in two monochrome tones in the image processing apparatus 102.

Figure 14:
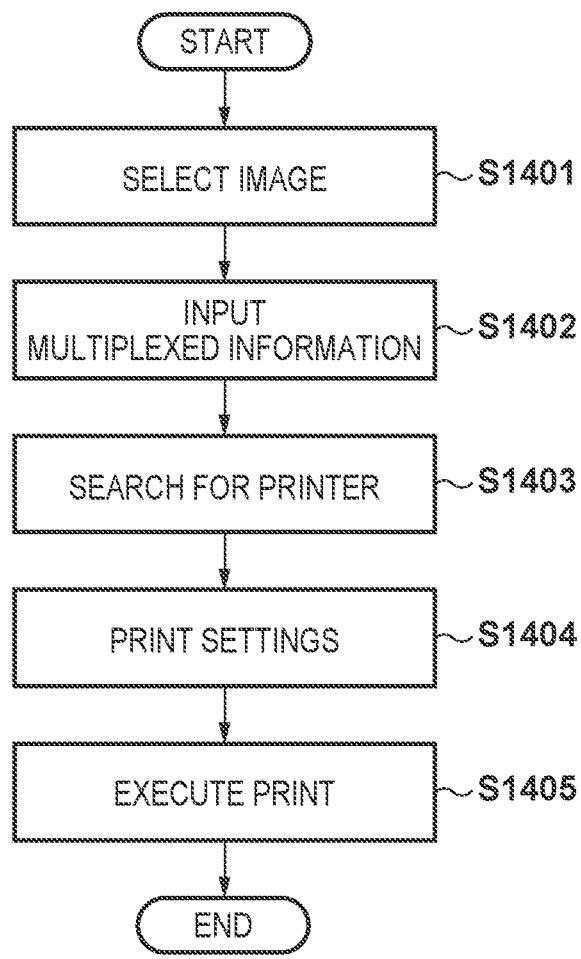
FIG. 14 is a flowchart showing processing to be executed by the information processing apparatus.

FIG. 14 is a flowchart showing processing to be executed by the information processing apparatus 101 until printing of print target image data is executed. The processing shown in FIG. 14 is implemented by, for example, the CPU 201 reading out a program stored in the ROM 202 to the RAM 203 and executing. The program configured to execute the processing shown in FIG. 14 is installed as, for example, a print application in the information processing apparatus 101. The processing shown in FIG. 14 is started when, for example, the user activates the print application on the information processing apparatus 101.

In step S1401, the CPU 201 acquires selected image data (input image data) from the user. FIG. 15A is a view showing an example of a main screen 1501 displayed on the print application. As shown in FIG. 15A, a button 1502 is displayed on the main screen 1501. When the button 1502 is pressed by the user, an image selection screen (not shown) is displayed, and the use can select arbitrary image data. As an image acquisition method, image data in the information processing apparatus 101 may be acquired, or image data may be acquired from a server (not shown) via the network. Image data may be acquired from image data prepared in advance in the print application. In this embodiment, image data will be described. However, not image data but document data such as PDF may be used, and any data that can be converted into two-dimensional RGB data is usable. The image data selected as the print target by the user is image data of an additional information multiplexing target. The CPU 201 acquires the selected image data as the multiplexing target data, and temporarily stores it in the RAM 203 such that it can be reused in the print application.

Also, in a display region 1504 of the main screen 1501, the image of the image data selected by the user is displayed. Note that if the storage area of the RAM 203 in the information processing apparatus 101 is in shortage, the image data may be stored as a file in the secondary storage device 204, and a reduced image (thumbnail image) obtained by reducing a designated image may be displayed on the screen of the print application.

In step S1402, the CPU 201 acquires additional information to be multiplexed on the image data selected by the user in step S1401. As shown in FIG. 15A, a check box 1503 and an input region 1505 are provided in the main screen 1501. The user can instruct multiplexing on the selected image data by checking the check box 1503. Also, the user can input arbitrary text information to the input region 1505. The CPU 201 acquires the text information input to the input region 1505 as additional information to be multiplexed on the image data.

In this embodiment, text information will be described as multiplexing information. However, this may be information of another type such as an audio, a photo, or a moving image, which can be handled as binary data. The CPU 201 stores the text information input by the user in the RAM 203 such that it can be reused in the print application or as a file in the secondary storage device 204.

In step S1403, the CPU 201 searches for the image processing apparatus 102. As shown in FIG. 15A, a button

1506 is displayed in the main screen 1501. If the button 1506 is pressed by the user, the CPU 201 transmits a printer search broadcast to the network 220. By the broadcast, information is transmitted to all hosts that share the same network. When the image processing apparatus 102 returns a reply to the information processing apparatus 101 that is the broadcast transmission source, the information processing apparatus 101 can grasp the IP address of the image processing apparatus 102, and one-to-one communication can be performed from then on. In this embodiment, the identification information of a printer that has responded is automatically registered in the print application. In this example, for the descriptive convenience, the printer in the network 220 is assumed to be only the image processing apparatus 102. Pieces of information registered in the print application are, for example, a printer name and the IP address of the printer. The printer name is displayed as a printer name 1507 on the main screen 1501.

In step S1404, the CPU 201 acquires information concerning print settings from the image processing apparatus 102 found in step S1403, and accepts print settings from the user. Normally, the printer can acquire a medium (print medium), size, print settings, and the like that the printer itself supports.

In this embodiment, communication between the print application in the information processing apparatus 101 and the image processing apparatus 102 is done by XML (Extensible Markup Language). XML is one of methods of expressing information. Data transmission/reception is not necessarily performed by this, and another protocol or communication method may be used. An example of XML for requesting the image processing apparatus 102 to acquire information concerning print settings is shown below.

```
001:<?xml version="1.0" encoding="UTF-8"?>
002:<cmd>
003:<operation>getInformation</operation>
004:</cmd>
```

The first row indicates that the XML is version 1.0, and the character encoding scheme is UTF-8. <cmd> in the second row means the start of a command received by the printer, and </cmd> in the fourth row indicates the end of the command. When a tag is added in the cmd tag and transmitted to the image processing apparatus 102 by the print application, the image processing apparatus 102 executes an operation according to the contents of the tag. For example, operation in the third row describes the operation type of the printer, and getInformation represents an operation of returning acquired information to the application of the request source. An example of XML that the image processing apparatus 102 returns to the print application is shown below.

```
001:<?xml version="1.0" encoding="UTF-8"?>
002:<res>
003:<name>printer001</name>
004:<medialist>
005:    <media>
006:        <name>A4</name>
007:        <width>2000</width>
008:        <height>3000</height>
009:    </media>
010:    <media>
011:        <name>L</name>
012:        <width>1000</width>
013:        <height>1500</height>
014:    </media>
015:    <media>
016:        <name>Hagaki</name>
017:        <width>1500</width>
018:        <height>2250</height>
019:    </media>
020:</medialist>
021:    <colormode>
022:        <mode>color</mode>
023:        <mode>mono</mode>
024:    </colormode>
025:</res>
``` res in the second row means a response from the printer. In this embodiment, a command starting from <cmd> is used for information from the print application to the printer, and a command starting from <res> is used for information from the printer to the print application. However, the present invention is not limited to this. name in the third row indicates the printer name. The fourth to 20th rows represent the list of supported paper sizes, and media that the printer can support are listed in the <medialist> tag. Here, in the <media> tag, tags of name, width, and height exist, which represent the name of a sheet, an image height (pixel), and an image width (pixel), respectively. Based on these pieces of information, it can be seen that if the paper size is, for example, A4 (210 mm (vertical)×297 mm (horizontal)), an image size of 2,000 px (width)×3,000 px (height) is necessary. In general, the image size depends on dpi (dots per inch) of the printer. dpi is a unit representing how finely ink can be arranged. If the value of dpi is high, a high-definition expression, that is, so-called high-resolution printing is possible. That is, even in the same A4 size, the higher the dpi is, the larger the number of pixels of image data needed for printing is. On the other hand, image data designated by the print application does not always have the number of pixels necessary for the printer. In this case, enlargement or reduction, or trimming is performed in the printer or by a printer driver to correct the input image into a size necessary for the printer, and printing is performed after that. For example, when printing an image of 4,000 px (height)×6,000 px (width) using the image processing apparatus 102, it is impossible to directly execute print processing because the data includes pixels in number more than necessary for the A4 size. Hence, the image data is converted into, for example, 2,000 px (height)×3,000 px (width) in the printer or by the printer driver, and printing is performed after that.

In the 21st to 24th rows, selectable print color setting modes are listed. In this embodiment, two types of modes, that is, "color" that is a color mode and "mono" that is a monochrome mode can be selected. The color mode is a print mode in which printing is performed using a plurality of colors of inks of the printer. The printer normally expresses colors by subtractive color mixture. In subtractive color mixture, normally, all colors can be expressed by three colors, that is, C (cyan), M (magenta), and Y (yellow), and the image processing apparatus 102 uses inks of three colors C, M, and Y Note that the ink types are not limited to these, and gray ink that is a spot ink or ink colors such as RGB other than CMY may be provided.

On the other hand, the monochrome mode is a print mode in which printing is performed after the color information of an input image is replaced with gray information. The monochrome mode is sometimes performed in order to, for example, decrease the ink amount to be used or improve the printing speed. In the monochrome mode, a single black ink (K) or a plurality of achromatic color inks are used. Also, process black may be formed by CMYK. Note that in this embodiment, a mode for implementing monotone colors, such as a sepia mode or a grayscale mode, is included in the monochrome mode.

In this embodiment, to multiplex additional information in a case in which the monochrome mode using only black ink is set by the user, the print setting is changed from "monochrome mode" to "color mode". As a result, in the image processing apparatus 102, color printing is performed using color inks. Even if the print setting is changed to "color mode", the tint of an output product is close to gray from the viewpoint of image quality expected in the monochrome mode. That is, an image whose tone is expressed by the density of dots printed in black is output.

Figure 15B:
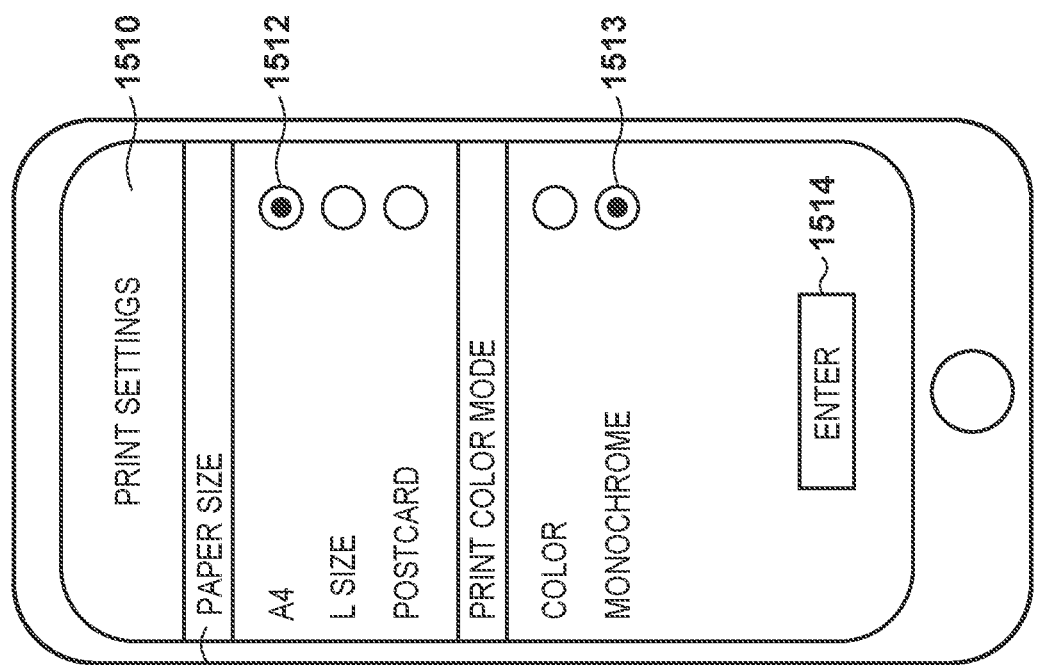
FIGS. 15A and 15B are views showing user interface screens.
Figure 15A:
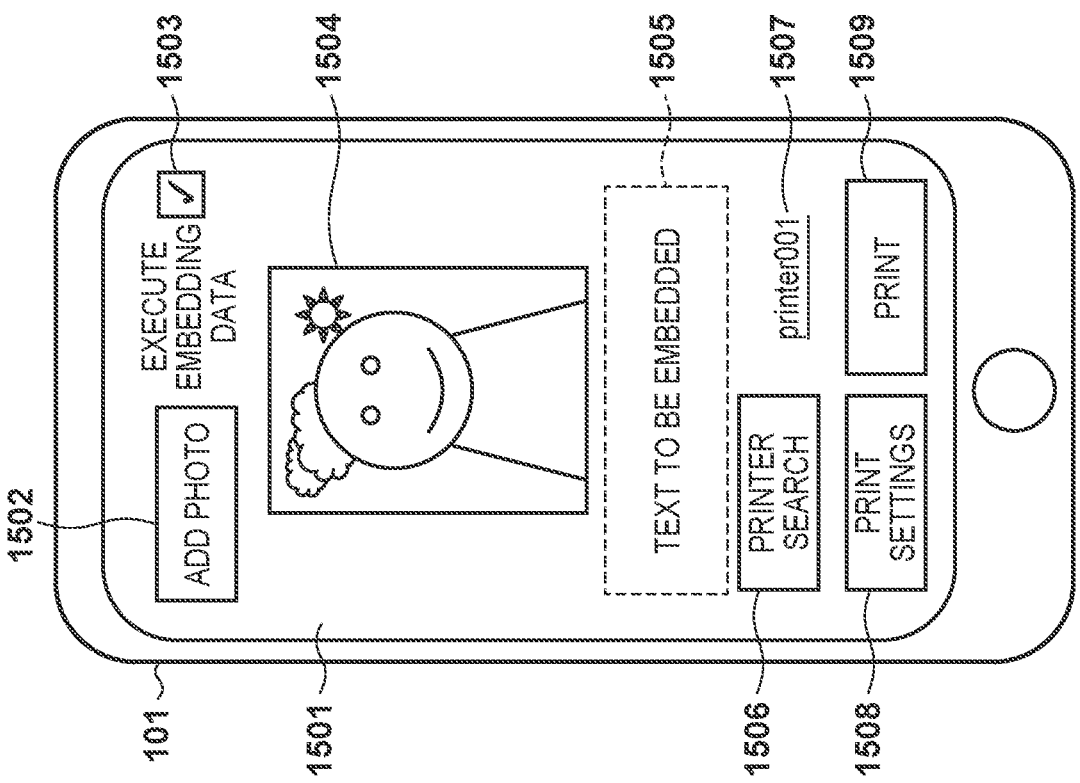

FIG. 15B is a view showing an example of a print setting screen 1510 displayed on the print application. The print setting screen 1510 is displayed when a print setting button 1508 on the main screen 1501 is pressed. The print setting screen 1510 is displayed based on information concerning the print settings acquired from the image processing apparatus 102. As shown in FIG. 15B, the print setting screen 1510 is displayed such that selection of the items of a paper size 1511 and a print color mode 1513 can be accepted.

Here, assume that the user turns on the check box 1503 for executing multiplexing processing, and sets a paper size "A4" indicated by a selection button 1512 and a print color mode "monochrome" indicated by the selection button 1513. Upon accepting pressing of a decision button 1514 from the user, the CPU 201 temporarily stores the items that the user sets on the print setting screen 1510 in a storage area of the RAM 203 or the like such that these can be referred to later. When the decision button 1514 is pressed, display returns to the display of the main screen 1501. After pressing of a print button 1509 on the main screen 1501 is accepted from the user, print processing by the image processing apparatus 102 is started.

Figure 16:
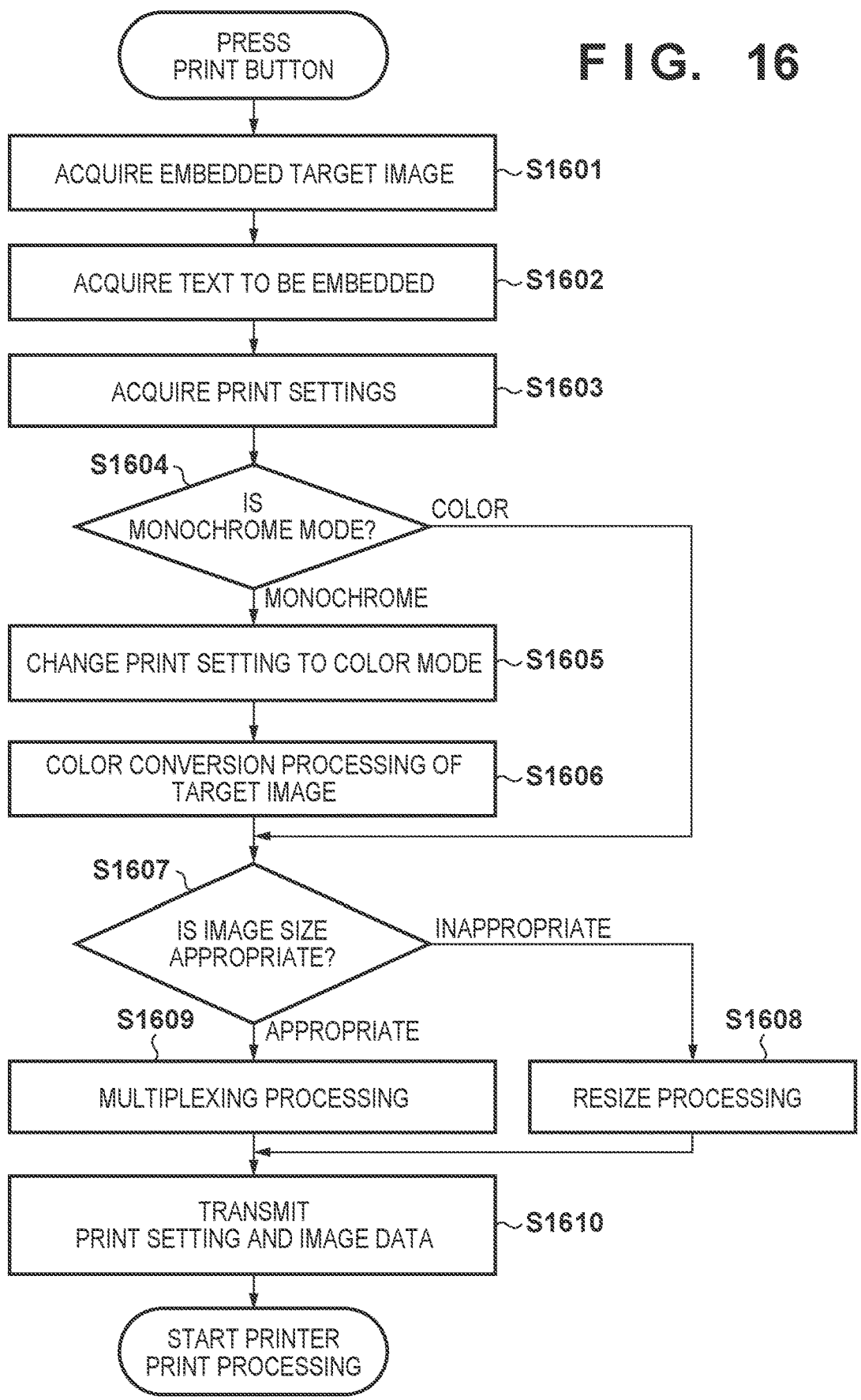
FIG. 16 is a flowchart showing processing until print processing is started.

FIG. 16 is a flowchart showing processing until print processing by the image processing apparatus 102 is started. The processing shown in FIG. 16 is implemented by, for example, the CPU 201 reading out a program stored in the ROM 202 to the RAM 203 and executing. Also, on condition that the check box 1503 and the selection button 1513 are set as described above, the processing shown in FIG. 16 is started when the print button 1509 on the main screen 1501 is pressed.

In step S1601, the CPU 201 acquires, from the RAM 203, print target image data selected by the user on the main screen 1501. In step S1602, the CPU 201 acquires additional information input by the user on the main screen 1501, for example, text data. In step S1603, the CPU 201 acquires print settings set by the user.

In step S1604, the CPU 201 determines, based on the print settings acquired in step S1603, whether the monochrome mode is set. Upon determining that the monochrome mode is set, in step S1605, the CPU 201 changes the print setting from "monochrome mode" to "color mode". As described above, if the monochrome mode is set as the print setting, monochrome conversion is executed in the printer or by the printer driver. For example, when executing monochrome conversion in the printer, image data that has undergone multiplexing is transmitted to the image processing apparatus 102, and monochrome conversion is then executed in the printer. Here, monochrome conversion is conversion for setting one color serving as a reference in an image and express the image only by the shading change of the color. As image data, this is expressed as the density of data in a certain region. That is, components other than luminance component, for example, a and b in Lab or U and V in YUV do not change. In the method of executing multiplexing by giving variations to components other than luminance, additional information is missing, and decoding cannot be performed. Hence, in this embodiment, if the monochrome mode is set by the user, the print setting is changed to the color mode such that monochrome conversion is not executed in the printer or by the printer driver. At this time, predetermined color conversion processing is executed such that a tint corresponding to the monochrome mode desired by the user can be output even in the color mode. With this configuration, to the user, the image processing apparatus appears to operate in accordance with the set print mode and additional information multiplexing processing is possible. In this embodiment, as color conversion processing that is an alternate to monochrome conversion using black ink, grayscale conversion is executed as the predetermined color conversion processing.

For branch of processing from step S1604, for example, the following configuration may be used. For example, a black list may be held in advance in the secondary storage device 204 or a program, and the black list may be compared with the information concerning the print setting acquired from the image processing apparatus 102. The black list is a list that describes the names of services and software that should not be used. For example, a character string "mono" is described as a text file in the black list. If the print setting matches the description of the black list, the process advances to step S1606. Note that to hold a plurality of pieces of information in the black list or describe color conversion processing to be executed if the description matches the black list, CSV (Comma-Separated Values) or a general database may be used.

Alternatively, the print application may acquire information from the server on the network. The print application can acquire the printer name by communicating with the image processing apparatus 102. A query may be transmitted to the server using the printer name, and branch of processing from step S1604 may be performed. In this case, the server holds the printer name and the print setting, and information representing whether to perform monochrome conversion for the combination. That is, in this configuration, the black list is held on the network side.

In addition, information acquired from the image processing apparatus 102 may be used. Information representing whether multiplexing is possible may be added to colormode in XML including the above-described printer information. For example, the following XML is used.

```
001:<?xml version="1.0" encoding="UTF-8"?>
002:<res>
003:~ partially omitted ~
004:<colormode>
005:        <mode>
006:            <modename>color</modename>
007:            <steganography>true</steganography >
008:        </mode>
009:        <mode>
010:            <modename>mono</modename>
011:            <steganography>false</steganography >
012:            <alternate>grayscaletransform</alternate>
013:            <colormode>color</colormode>
014:        </mode>
015:</colormode>
016:</res>
```

In the above XML, new information is added to <mode> of <colormode>, as compared to the above-described XML. First, <steganography> in the 11th row includes information representing whether multiplexed additional information is missing due to the color mode setting. If this tag is false, this means that the multiplexed additional information is missing. The <alternate> tag in the 12th row describes an alternate method for preventing additional information from missing, and <colormode> in the 13th row describes a print setting after the alternate method is used. The above notation represents information "multiplexing cannot directly be performed in the monochrome mode, but instead, grayscale conversion is adapted to the image, and the print color mode is set to color". For example, if the information acquired from the image processing apparatus 102 represents the above-described information, processing after step S1605 is performed. In grayscaletransform in the <alternate> tag, corresponding processing on the print application side is grasped. On the other hand, the contents of processing itself may be described. For example, a program for image conversion may directly be written in the XML in the following way, interpreted on the print application side, and executed.

```
~ omitted ~
001:        <alternate>
002:        function transform(r, g, b){
003:            var gray = 0.299*r + 0.587*g + 0.114*b;
004:            return {r: gray, g:gray, b:gray};
005:        }
006:        </alternate>
~ omitted ~
```

The second to fifth rows represent a function according to the JavaScript notation. This is a function for returning R, G, and B after change when the pixel data of R (Red), G (Green), and B (Blue) are given as arguments. The third row corresponds to processing of grayscale-converting R, G, and B. When this function is acquired by the application, and the result of interpreting this by an interpreter operating on the CPU 201 is executed from the application, dynamic program execution is possible. For example, when an eval function provided by JavaScript is used, the above-described function can be interpreted as a program and executed from the application. Also, another script language may be used, or an interpreter that interprets processing contents and executes may be prepared independently. When a notation as described above is used, even if a print setting other than monochrome conversion that causes missing of multiplexed additional information is added to the image processing apparatus 102, it is possible to cope with this as needed.

In this embodiment, a case in which the print application holds the black list and copes with only a monochrome print setting will be described as an example. The black list may be incorporated in the print application (stored in the secondary storage device 204), or may be directly described as a program.

If the print setting is changed from "monochrome mode" to "color mode" in step S1605, in step S1606, the CPU 201 executes grayscale conversion for the multiplexing target image data. In monochrome conversion, normally, printing using one color ink is performed, and a tone is expressed by shading. In this embodiment, however, grayscale conversion is performed as an alternate to monochrome conversion using black ink. That is, multiplexing processing to be executed in step S1609 of the subsequent stage is performed based on grayscale-converted image data. For example, multiplexing processing to be executed in step S1609 of the subsequent stage may be performed for grayscale-converted image data having gray tones of 0 to 255, or may be performed for a halftone image whose pixel values are expressed only by the density of two values of 255 (white) and 0 (black). However, in this embodiment, the grayscale-converted image data or the image data expressed only by the density of two values is converted into image data of a plurality of channels such as RGB, and as a result, multiplexing using variations of color components is possible.

Figure 17:
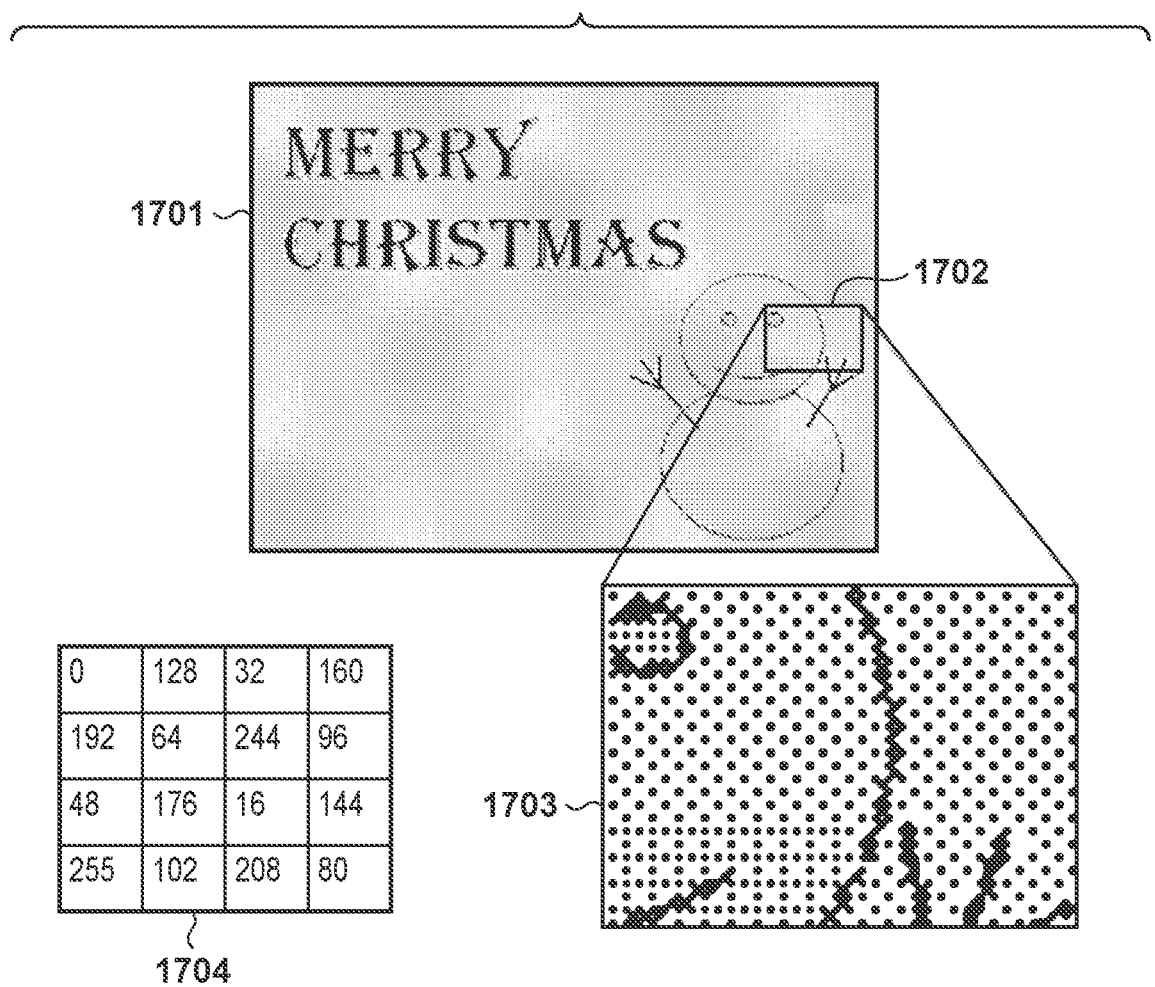
FIG. 17 is a view showing a dot image.

FIG. 17 is a view showing an example of an image 1701 expressed by the density of two values. An image 1703 is an enlarged image of a part 1702 of the image 1701. It can be found that the density of black and white changes depending on a region. Here, for example, a mask 1704 of 4 px×4 px is used. The mask 1704 is arranged on the image region shown in FIG. 6 without overlapping, and a value of the mask 1704 and a pixel value of the image shown in FIG. 6 are compared. If the pixel value is smaller than the value of the mask 1704, the pixel value is converted into a pixel value of 0 (black). If the pixel value is larger, the pixel value is converted into a pixel value of 255 (white). Note that although the pixel value of 255 is expressed as white on image data, the image processing apparatus 102 does not discharge ink to the region of the pixel value of 255 if the print medium is white.

FIG. 18 is a flowchart showing an example of the processing of step S1606. In step S1801, the CPU 201 determines whether the image data input to the processing of step S1606 is of a format of a plurality of channels, for example, whether the image data is formed by a plurality of channels such as RGB or YCbCr. Upon determining that the image data is formed by a plurality of channels, in step S1802, the CPU 201 converts it into image data formed by a single channel (grayscale conversion). In step S1802, for example, RGB image data is converted into grayscale image data expressed by monochromating or Y of YCbCr. In step S1803, the CPU 201 executes halftone processing by a dither method or an error diffusion method. On the other hand, upon determining in step S1801 that the image data is image data formed by a single channel, the halftone processing of step S1803 is executed after that.

After step S1803, the CPU 201 converts the image data generated in step S1803 into data of a plurality of channels represented by the values of color signals. For example, the image data generated in step S1803 is converted into RGB image data corresponding to black (pixel value "0") and white (pixel value "255"). When the image data of a plurality of channels is generated in this way, additional information multiplexing to be executed in the subsequent stage by varying color components is possible. After step S1804, the processing shown in FIG. 18 is ended.

When the processing shown in FIG. 18 is performed, input image data can be converted into image data expressed only by the density of two values (black and white). The size of an ink dot printed by the image processing apparatus 102 is much smaller than the resolving power of a human eye. For this reason, the actual print product is recognized by the human eye not as the density of dots, like the image 1703, but as shading of black and white.

After step S1606, the process advances to step S1607. Upon determining in step S1604 that "color mode" is set, processing of step S1607 is executed. In step S1607, the CPU 201 determines whether the image size of the image data matches the size (for example, A4) necessary for printing. Upon determining that the image size does not match the size necessary for printing, in step S1608, the CPU 201 executes resize processing to perform resize to the size necessary for printing. This is because if resize of the image is performed by the printer driver or in the printer, the period of spectra intended in the multiplexing embedding changes and affects decoding. In particular, if reduction is executed in resize, multiplexed additional information may be missing because pixels are thinned. In this embodiment, resize of the image is performed before multiplexing processing, thereby preventing multiplexed additional information from missing due to resize of the image. As the resize, linear interpolation such as nearest neighbor, bilinear, or bicubic may be used. Also, in this embodiment, grayscale conversion is performed, and after that, resize is performed. These processes may be performed in a reverse order. After step S1608, or upon determining in step S1607 that the image size matches the size necessary for printing, the process advances to step S1609.

In step S1609, the CPU 201 multiplexes the additional information, for example, text data acquired in step S1603 on the image data processed up to step S1607 or S1608. The multiplexing processing is executed for color components, as described above, for example, CbCr components after conversion from RGB to YCbCr. When multiplexing processing is executed by the processing shown in FIG. 16, it is possible to print the image data in a decodable state by the image processing apparatus 102 while guaranteeing the print settings intended by the user.

In step S1610, the CPU 201 transmits a printing execution instruction to the image processing apparatus 102. An example of XML for instructing printing execution is shown below.

| 001: | <?xml version="1.0" encoding="UTF-8"?> |
| 002: | <cmd> |
| 003: | <operation>print</operation> |
| 004: | <data>base64 data of jpeg</data> |
| 005: | </cmd> | print of the <operation> tag in the third row indicates printing execution. The <data> tag in the fourth row describes image data. Here, it is described, as an example, that a jpeg image of the base64 format is transmitted.

After step S1610, the processing shown in FIG. 16 is ended. After the processing shown in FIG. 16 is ended, the image processing apparatus 102 that has received the transmitted information starts printing.

As described above, in this embodiment, if a print setting that may cause missing of multiplexed additional information is done, processing that is an alternate to processing to be performed under the print setting is performed, and then, multiplexing of additional information is executed. Hence, it is possible to prevent multiplexed additional information from missing and perform printing in a decodable state while maintaining image quality desired by the user.

Also, in this embodiment, the processing shown in FIGS. 14 and 16 is executed by the information processing apparatus 101. However, the processing may be executed by the image processing apparatus 102. In this case, for example, image data captured by the information processing apparatus 101 such as a smartphone is acquired as image data of the print target and multiplexing target.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-097465, filed Jun. 10, 2021, which is hereby incorporated by reference herein in its entirety.

What is claimed is:

1. An information processing apparatus comprising:
one or more circuits; or
one or more processors and at least one memory, the at least one memory being coupled to the one or more processors and having stored thereon instructions executable by the one or more processors,
wherein at least one of the one or more circuits or the execution of the instructions by the one or more processors cause the information processing apparatus to function as:
an acquisition unit configured to acquire input monochrome image data representing a print target image and being comprised of one color component; and
a multiplexing unit configured to convert, in a case where print setting for the print target image is set for performing a process for multiplexing additional information on the print target image, the input monochrome image data to three-color-components monochrome image data representing monochrome image and being comprised of three color components and further configured to perform processing for multiplexing additional information on the print target image to the three-color-components monochrome image data.

2. The apparatus according to claim 1, wherein if the acquisition unit acquires input image data representing a print target image and being comprised of three color component, the multiplexing unit converts the input image data into monochrome image data being comprised of one color component.

3. The apparatus according to claim 2, wherein the multiplexing unit converts the monochrome image data converted from the input image data to the three-color-components monochrome image data, and the multiplexing unit performs the processing on the three-color-components monochrome image data.

4. The apparatus according to claim 3, wherein the multiplexing unit multiplexes the additional information by varying a color component.

5. The apparatus according to claim 1, wherein the print setting is set by a user.

6. The apparatus according to claim 1, wherein the at least one of the one or more circuits or the execution of the instructions by the one or more processors further causes the information processing apparatus to function as a determination unit configured to determine, based on a size of a print medium on which printing for the print target image is to be executed, whether to execute resize of the three-color-components monochrome image data, wherein if it is determined, by the determination unit, to execute the resize of the three-color-components monochrome image data, the resize of the three-color-components monochrome image data is executed before the multiplexing of the additional information by the multiplexing unit.

7. The apparatus according to claim 1, further comprising a display unit configured to display a user interface screen, wherein the input monochrome image data acquired by the acquisition unit is image data selected by a user on the user interface screen.

8. The apparatus according to claim 7, wherein the additional information is information input by the user on the user interface screen.

9. The apparatus according to claim 1, wherein multiplexing of additional information includes varying a color component of the three-color-components monochrome image data.

10. A method comprising:

acquiring input monochrome image data representing a print target image and being comprised of one color component;

converting, in a case where print setting for the print target image is set for performing a process for multiplexing additional information on the print target image, the input monochrome image data to three-color-components monochrome image data representing monochrome image and being comprised of three color components; and performing processing for multiplexing additional information on the print target image to the three-color-components monochrome image data.

11. A non-transitory computer-readable storage medium storing a program configured to cause a computer to operate to:

acquire input monochrome image data representing a print target image and being comprised of one color component;

convert, in a case where print setting for the print target image is set for performing a process for multiplexing additional information on the print target image, the input monochrome image data to three-color-components monochrome image data representing monochrome image and being comprised of three color components; and perform processing for multiplexing additional information on the print target image to the three-color-components monochrome image data.

* * * * *